UNITED STATES PATENT OFFICE.

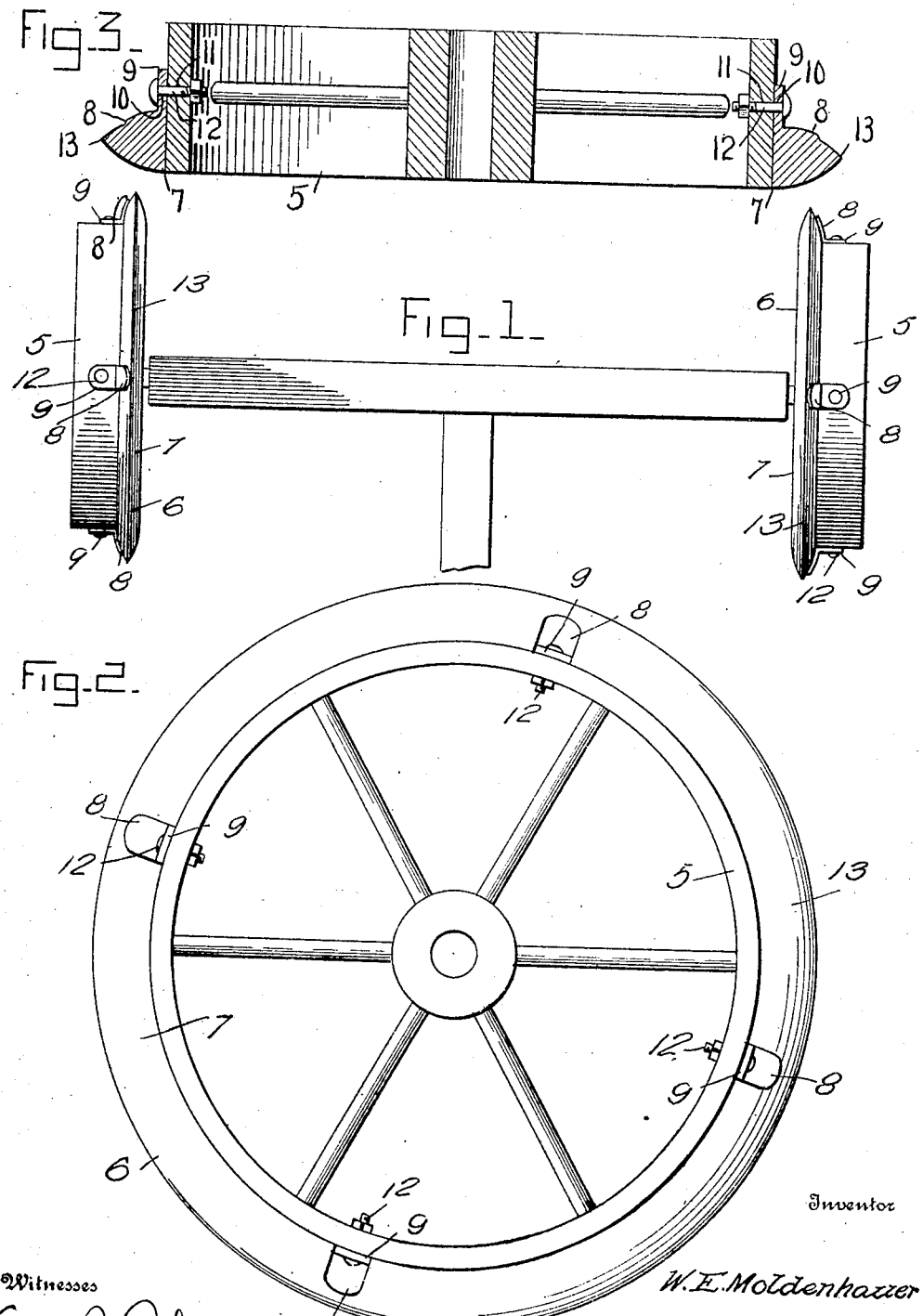

WILLIAM E. MOLDENHAUER, OF WILD ROSE, WISCONSIN.

VINE-CUTTER.

No. 882,333.　　Specification of Letters Patent.　　Patented March 17, 1908.

Application filed January 9, 1907. Serial No. 351,516.

*To all whom it may concern:*

Be it known that I, WILLIAM E. MOLDENHAUER, a citizen of the United States, residing at Wild Rose, in the county of Waushara, State of Wisconsin, have invented certain new and useful Improvements in Vine-Cutters; and I do hereby declare the following to be a full, clear, and exact description of the invention, such as will enable others skilled in the art to which it appertains to make and use the same.

This invention relates to vine cutters, and more particularly to a vine-cutting device for use in connection with the ordinary forms of potato diggers.

It is a well-known fact to those skilled in the art that the heavy potato digging machines, while they operate very successfully on level ground, will skid or slip when traveling upon a hillside, and especially is this true when the soil is moist. To add to the disagreeable feature just mentioned the vines, upon the hillside, are often very large and tough and the progress of the potato digging machine is therefore extremely slow and unsatisfactory.

My invention is particularly designed for use in connection with a potato digging machine having flat front wheels at its forward end and it is designed, by being attached to these wheels, to obviate both of these features. The device contemplated in my invention is not a wheel in itself and I do not intend to place it upon the market in such form but it is an annular blade, thickened at its inner periphery and sharpened to a knife edge at its outer periphery and provided with attaching ears by means of which it may be bolted to any of the standard size wheels. It is, of course, reasonable to suppose that nearly every farmer is provided with a suitable metal drill for drilling bolt holes and, even if this is not so, the cost of having these holes drilled in the ordinary wheels of the potato digger would be a very small one indeed. The device to be hereinafter described, as stated above, is to be placed upon the market by itself and to be sold as an attachment together with the necessary bolts for securing it to the wheels, and hence is not to be confused with flanged wheels for this purpose if any such are now on the market.

In the accompanying drawings: Figure 1 is a plan view of the forward portion of a potato digger showing the invention in use, Fig. 2 is a side elevation of a wheel showing my device applied thereto, Fig. 3 is a horizontal sectional view through the wheel.

Referring more specifically to the drawings, the numeral 5 denotes one of the pair of front wheels or runners for a potato digger, which wheels are shown as having flat peripheries. My invention resides in the provision of an annular blade or flange which is indicated by the numeral 6 and it is broadened at its inner periphery as at 7, and of such size at this periphery that it will exactly and snugly fit over the outer periphery of the wheel 5.

Secured by welding or other means at intervals upon one side of the flange or blade are ears 8 which have laterally extending portions being designed to also fit against the outer periphery of the wheel 5. In practice, when applying my invention to a wheel of the class described, bolt openings 11 are drilled through the periphery of the wheel at the proper points and the flange or blade then having been placed upon the wheel periphery, bolts 12 are engaged through these openings and through the bolt openings 10 in the laterally projecting portions 9 of the ears 8. As shown in Fig. 3 of the drawings, the blade or flange 6 is tapered towards its outer periphery and sharpened to a knife edge 13.

What is claimed is:—

The combination with a wheel having a broad rim which is provided with a plurality of bolt openings, an annular flange member which is conoidal in cross section, ears formed integral with one side of the member and extending laterally therefrom in a plane with the base of the conoid, said ears being provided with bolt openings which register with the bolt openings in the rim of the wheel, and bolts engaged through said ears and rim.

In testimony whereof, I affix my signature, in presence of two witnesses.

WILLIAM E. MOLDENHAUER.

Witnesses:
C. A. SMART,
JOHN M. PROTHEROE.